United States Patent
van Liempd et al.

(10) Patent No.: US 6,369,833 B1
(45) Date of Patent: Apr. 9, 2002

(54) OPERATOR CONTROL UNIT FOR A REPRODUCTION APPARATUS

(75) Inventors: Joris van Liempd, Oss; Leo H. R. N. Schliekelmann, Eindhoven, both of (NL)

(73) Assignee: Oce-Technologies B.V., Ma Venlo (NL)

( * ) Notice: Subject to any disclaimer, the term of this patent is extended or adjusted under 35 U.S.C. 154(b) by 0 days.

(21) Appl. No.: 09/181,001

(22) Filed: Oct. 28, 1998

(30) Foreign Application Priority Data

Oct. 31, 1997 (NL) ............................................. 1007407

(51) Int. Cl.[7] .............................. H04N 1/00; H04N 1/18
(52) U.S. Cl. ....................................... 345/700; 358/1.15
(58) Field of Search ............................... 358/1.15, 1.13, 358/1.9, 401; 345/700, 705, 707, 714, 737, 780, 831, 543, 520; 707/102, 504; 710/12, 14

(56) References Cited

U.S. PATENT DOCUMENTS

| | | | |
|---|---|---|---|
| 4,772,882 A | * 9/1988 | Mical | 340/709 |
| 4,873,570 A | * 10/1989 | Suzuki et al. | 358/80 |
| 5,095,448 A | * 3/1992 | Obuchi et al. | 395/144 |
| 5,287,448 A | * 2/1994 | Nicol et al. | 395/159 |
| 5,353,399 A | * 10/1994 | Kuwamoto et al. | 395/159 |
| 5,481,667 A | * 1/1996 | Bieniek et al. | 395/161 |
| 5,585,891 A | * 12/1996 | Altrieth et al. | 355/209 |
| 5,600,779 A | * 2/1997 | Palmer et al. | 395/340 |
| 5,602,996 A | * 2/1997 | Powers, III et al. | 395/344 |
| 5,859,638 A | * 1/1999 | Coleman et al. | 345/341 |
| 6,100,994 A | * 8/2000 | Schliekelmann et al. | 358/1.15 |
| 6,208,427 B1 | * 3/2001 | Lee | 358/1.15 |

FOREIGN PATENT DOCUMENTS

EP 0745929 * 12/1996 ............. G06F/3/12

* cited by examiner

*Primary Examiner*—Edward Coles
*Assistant Examiner*—Tia A Carter
(74) *Attorney, Agent, or Firm*—Birch, Stewart, Kolasch & Birch, LLP (57) ABSTRACT

A reproduction device having an operator control panel provided with a display screen and a number of keys. The operator control panel displays a template sentence in which a number of word fields to be filled in by the user appear. The words possible for each word field are displayed at such word fields and the user can select one of them. If the user has selected a word for each word field then a command (for example, a question to be asked) is formed in natural language that can be interpreted by the reproduction device (for example, so that an answer can be provided). In this way, it is possible to input to the machine specifications for copy jobs, print jobs and scan jobs to be carried out, and to form help questions. The inputting of complex jobs or the formulation of a correct help question are in this way greatly simplified for the user.

11 Claims, 8 Drawing Sheets

Register A

| 1 | How can I [--B--] [--C--]? |
| 2 | Please, make from the [--D--] original set [--E--] [--D--] [--F--] copysets. |

901

Register B 802

| $j_B$ | column 1 |
|---|---|
| 0 | define |
| 1 | shift |
| 2 | enlarge |
| 3 | change |
| 4 | staple |
| 5 | copy |
| 6 | magnify |
| 7 | zoom |
| 8 | set |

803

Register C 804

| column 2 |
|---|
| $j_B = 0$ |
| a:copy set; a: copy; an: area; an: image; a zoom factor; a: frontpage; : covers; a: backcover; a: frontcover. |
| $j_B = 1$ |
| an: area; an: image; a: page image. |
| $j_B = 2$ |
| an: original; an: area; a: job; an: image. |

803
803
803

Register D

| $j_D$ | |
|---|---|
| 0 | one sided |
| 1 | two sided |

Register F

| $j_F$ | |
|---|---|
| 0 | unstapled |
| 1 | stapled |

Register E

| $j_E$ | |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |

OPERATOR CONTROL UNIT FOR A REPRODUCTION APPARATUS

FIELD OF THE INVENTION

The invention relates to an operator control unit for operator control of a reproduction system.

BACKGROUND OF THE INVENTION

Operator control of a reproduction apparatus concerns making a number of settings on the apparatus such that a reproduction job is carried out in the required way. If a reproduction apparatus has a limited number of functions, then a simple and readily viewed operator control panel is sufficient for making the required settings, each function being assigned its own button or other operator control means.

A simple operator control panel of this kind will generally have number keys for inputting the number of copies to be made, a small alphanumerical display for displaying error messages, a start button for starting a copying action, and a limited number of keys for setting functions such as enlarge/reduce, light/dark, choice of sheet tray, and so on. However, the functionality of reproduction apparatus is continually increasing. As a result, operator control of these machines becomes ever more complex. If an apparatus has a large number of functions, then the approach outlined above will result a in a large operator control panel which is not readily surveyable.

One solution to this is menu-controlled operating panels. These have a display screen and a number of keys. A number of menus are displayed to the user on the screen stepwise and the user can use keys, the function of which is dependent on the menu displayed on the screen, to carry out the required apparatus settings. A system of this kind is described in U.S. Pat. No. 4,873,570 to Suzuki et al. (the Suzuki patent), in which a reproduction apparatus is described which is provided with an operator control system with menus.

The advantage of a menu-controlled operating panel is that many functions can be offered without the operating panel being overloaded with buttons. However, the large number of menus does not make this system readily surveyable to the user. Navigating a system of this kind is complicated and frightens users off because they do not know what a subsequent step will be and they are afraid of making errors. The Suzuki patent also describes the use of a help screen to assist the user in operating this system. However, a beginner often does not know how to call up such a help menu and is too little acquainted with the machine in order to formulate an adequate help question.

From the computer world, prompt command systems are known in which, after a prompt, a command has to be input with parameters. The advantage of this is the flexibility of the system. All the functions are supported in this way. The disadvantage is that a user must know by heart all these commands including the associated parameters. In addition, it is frequently undesirable to place a complete keyboard down at the apparatus. These are frequently public accessible machines used by a large number of people. A keyboard is appropriate, for example, only at a workstation, and is cumbersome for a public accessible machine. The operator usually stands in front of the machine and then a keyboard cannot be operated satisfactorily. In a case of this kind, it is more convenient to have a few buttons which can generally be operated with the index finger.

SUMMARY OF THE INVENTION

An object of the invention is to reduce the disadvantages of the above operator control systems to a far-reaching degree.

The invention provides an operator control unit for operator control of a reproduction system, the control unit comprising: a display for displaying operating screens; an operator interface for making selections on said operating screens; a first memory for storing a template sentence containing a series of words and word fields; a second memory for storing word sets corresponding to the word fields, each said word set containing word units; a controller for generating a first operating screen depicting said template sentence and corresponding word sets near said word fields of said template sentence; said controller selecting a word unit from one of said word sets in response to user actuation of said operator interface in order to include the word unit in a corresponding word field; said controller selecting a processor instruction based upon said template sentence and the selected word units; said controller confirming the selected word units in response to further user actuation of said operator interface; and a processor for performing the selected instruction in response to said selected instruction being confirmed by said controller.

With the configuration according to the invention, it is possible to keep the operator control panel readily surveyable and simple to operate. The configuration combines the flexibility of a prompt command system with the step-by-step guidance of a menu system, but without the disadvantages of these two systems. No keyboard is required, and hence the operator control unit is suitable for a machine at which the operator inputs settings while standing in front of it. There is no need for a large number of menus, and basically there is only one screen required, with which all the settings can be made. Commands can be displayed in an understandable language approximating natural language. The user is guided in the correct direction. This makes operation control possible for inexperienced and incidental users.

Working with a keyboard is cumbersome to those who have not been trained. Working in the manner of the invention is rapid. In contrast with a system in which entirely arbitrary sentences can be input, it is in this case possible to limit the possibilities so that the user is already guided in the correct direction without the messages becoming cryptic. A number of words can be displayed for the same function so that an inexperienced operator need not be acquainted with specific jargon with which functions sometimes tend to be displayed on a reproduction apparatus.

The system is easily combined with a display on which cascade menus are displayed and can thus readily be used for some functions while menus can also continue to be called up with the same operator interface.

In one advantageous application of the invention, there are at least two corresponding word sets for a word field and the controller selects one of the at least two corresponding word sets for display on the screen near the corresponding word field, on the basis of a word unit selected in another word field. In this way, it is possible to display in a following column only those word units which are relevant in combination with a previously chosen word unit. In this way, the operator is prevented from forming meaningless formulations. The above embodiment is further improved by the controller being provided with a repetitive mode of operation so that it is blocked for the period of repetition for the purposes of selecting a word unit in the other word field. This prevents another word set from being repeatedly displayed at another word field during the repeated modification of the selection from a first word set.

Another embodiment stores at least two template sentences and the controller selects a template sentence from a plurality thereof in dependence on the selections on the operating screens made for the purpose by an operator. The effect of this is that the operator can work with a template sentence most suitable for the situation at that time.

In another advantageous embodiment, the controller depicts the template sentence along a first axis and depicts a word set along a second axis extending perpendicularly to the first axis and intersecting the template sentence at the corresponding word field. In this way a readily surveyed operating screen is obtained.

Finally, in another embodiment of the invention, the selected instruction instructs the processor to display a help screen. The system according to the invention is outstandingly suitable for forming a question for a help function. The help system will of course be used primarily by inexperienced operators who are hardly acquainted with the machine and are usually not aware of the current terms for indicating specific functions. Because they are inexperienced it will be difficult for them to formulate a help question entirely on their own. The system helps them to form a question by first displaying a template sentence and then making a selection from a limited number of words for each word field. No keyboard is required, cascade keys are sufficient to be able to formulate the sentence.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein . . .

DETAILED DESCRIPTION OF THE PREFERRED EMBODIMENTS

Figure 1:
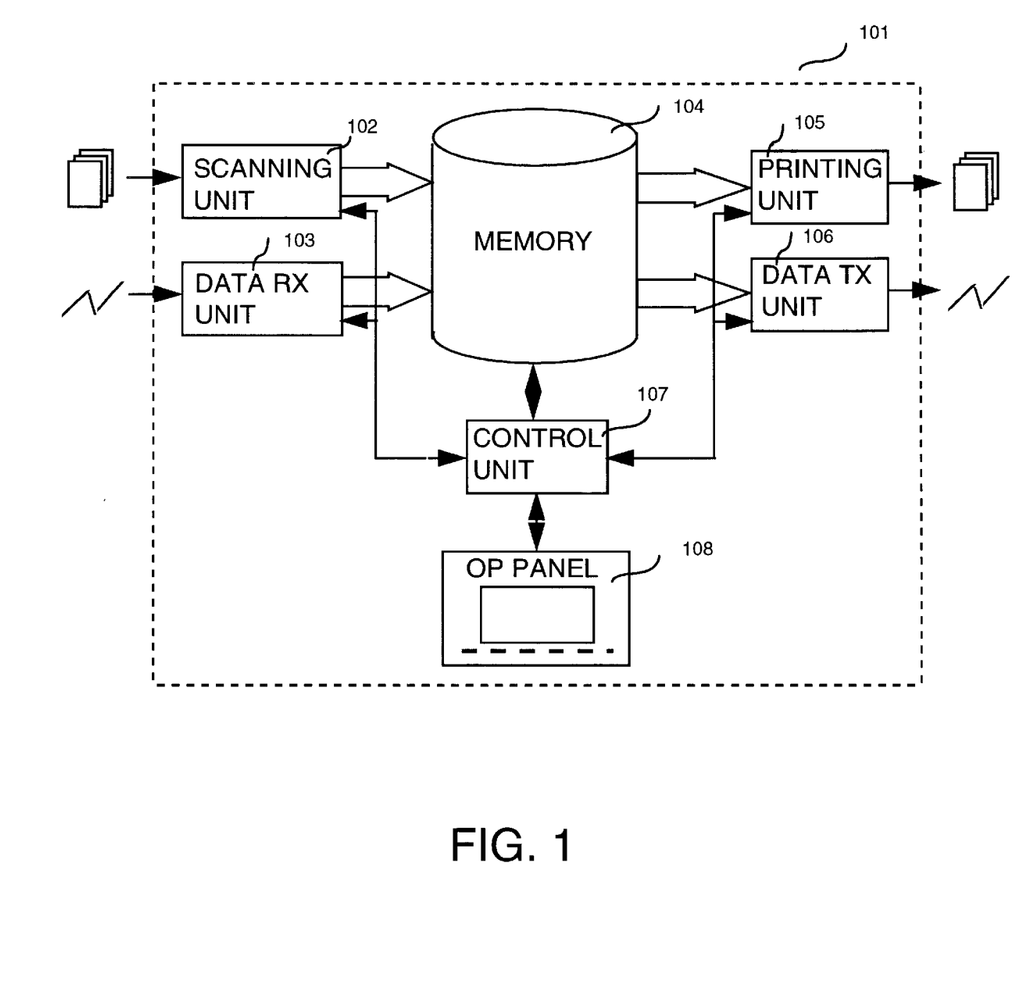
FIG. 1 is a diagrammatic illustration of a reproduction apparatus according to the invention.

FIG. 1 is a diagram showing a reproduction apparatus according to the invention. The reproduction apparatus according to the embodiment described here offers the user a copying function, a print function and a scan function.

In the copying function, which provides for making copies of paper originals, the operator first of all inputs the required settings for the copying job via the operator control unit 108. For this purpose unit 108 comprises an operator control panel provided with a number of keys grouped around a screen 110. The settings thus input form the job specification. The paper originals associated with the job are then scanned in through the agency of the scanning device 102. The job specification together with the electronic original images obtained through the agency of the scanning device are stored as the copying job in the memory 104. Control unit 107 manages a queue of jobs stored in the memory and ensures that when the copying job is next in line for printing the electronic original images and the associated job specification are passed to printing device 105. The latter further ensure that the prints are made in accordance with the job specification.

In the printing function, which provides for making prints of data received via a network, print jobs having of a number of electronic original images and a job specification are received by the data receiving unit 103. These print jobs originate, for example, from workstations connected to the reproduction apparatus 101 via a network. On receipt, the job is stored as a print job in the queue in the memory 104. Via the operator control unit 108 it is possible to amend the job specification while the job is still in the memory. Further processing is identical to the above-described processing of a copying job. The scanning function is intended to scan in paper originals and then send them in electronic form to a destination station via a network. For this purpose, the operator first of all inputs a job specification for the scanning job via the operator control panel 108. The original images are then read in 3via the scanning device 102 and then stored in the storage unit 104. From here they are fed, under the control of the control unit 107, to the data transmission unit 106, which they feed with the correct addressing to the network.

Figure 2:
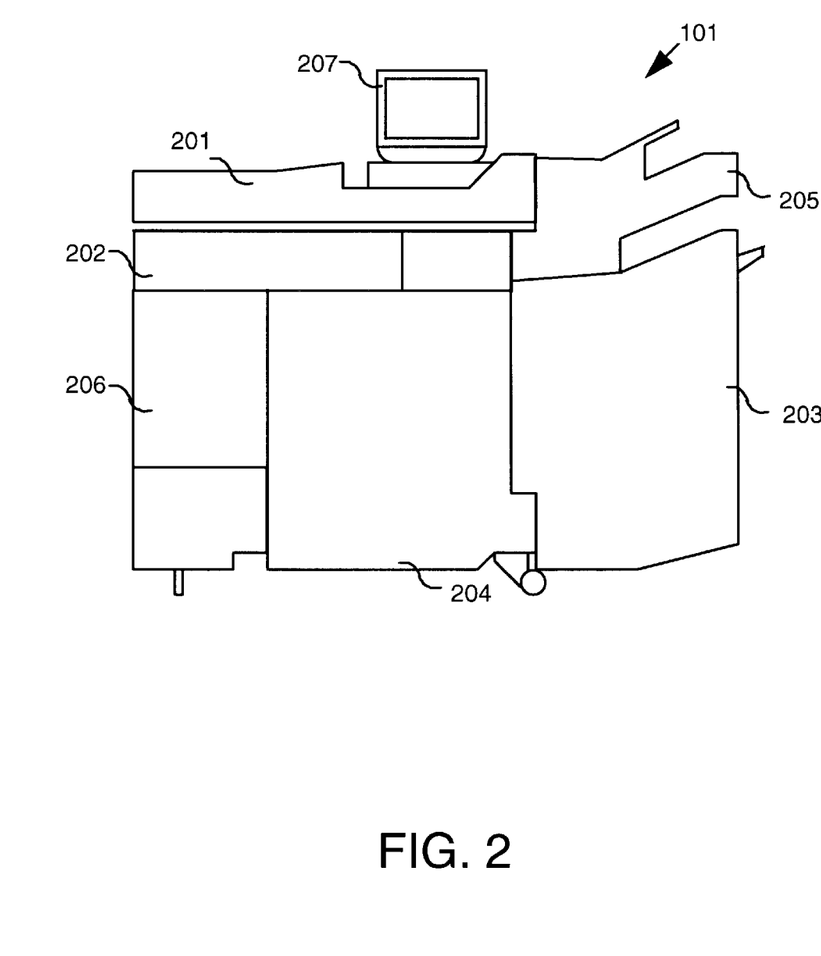
FIG. 2 is a diagram of a reproduction apparatus according to the invention.

FIG. 2 is an external view of one embodiment of the reproduction apparatus 101. In the embodiment illustrated, the scanning device comprises a scanner unit 202 and an automatic page feeder 201 for automatically feeding an original sheet or stack of original sheets placed therein to the scanner unit 202. The latter optically scans an original sheet fed thereto and converts the optical information into electrical image signals by photoelectric sensors such as a CCD. The printing device 105 in the embodiment illustrated comprises a reservoir for copy material 203, a printing unit 204 and a finishing module 205 for finishing and depositing the printed copy sheets. The image formation by the printing unit 204 can be effected in various ways. For example it is possible to use electrophotography with a photoconductor and laser or LED exposure or, for example, an inkjet. In addition, the image formation need not be restricted to one colour, but can also comprise a background colour or even full colour. Control unit 107 and storage unit 104 are accommodated in a compartment of the apparatus having the reference 206. The storage unit 104 is constructed as a combination of a hard disk and a RAM. The operator control panel 207 of the operator control unit 108 is disposed at the centre of the apparatus at a height such that all the keys are readily accessible and the screen readily visible to a standing operator.

Figure 3:
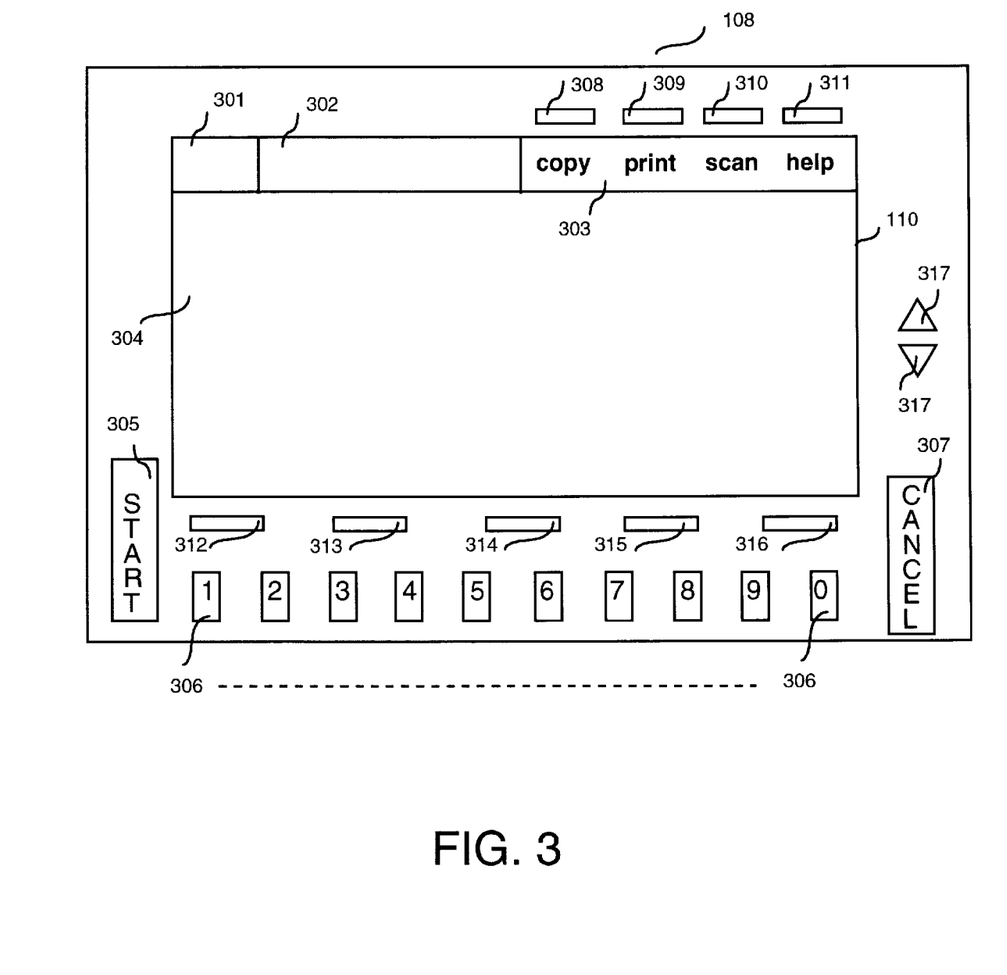
FIG. 3 illustrates an operator control unit according to the invention.
Figure 4:
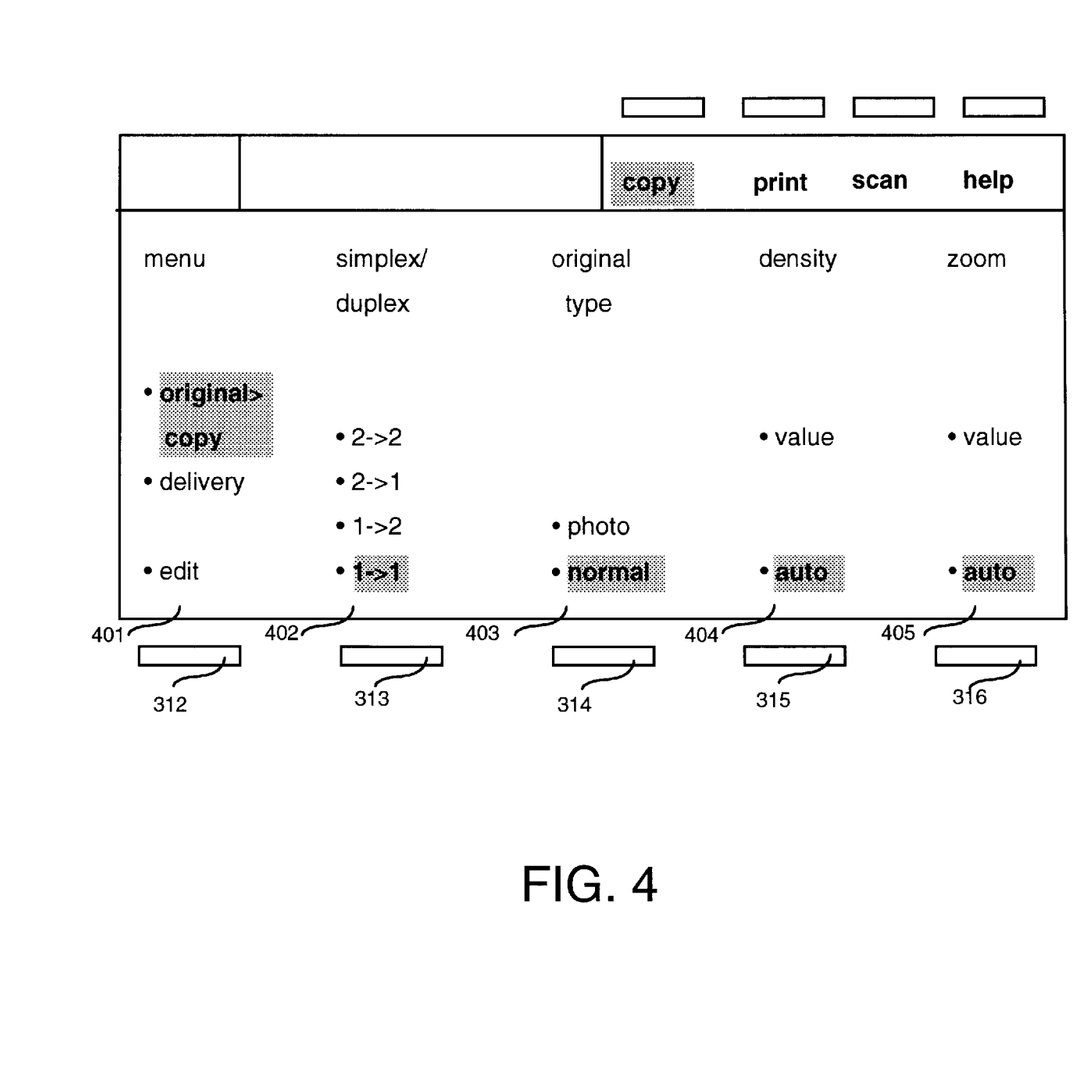
FIG. 4 shows a first operating screen.
Figure 5:
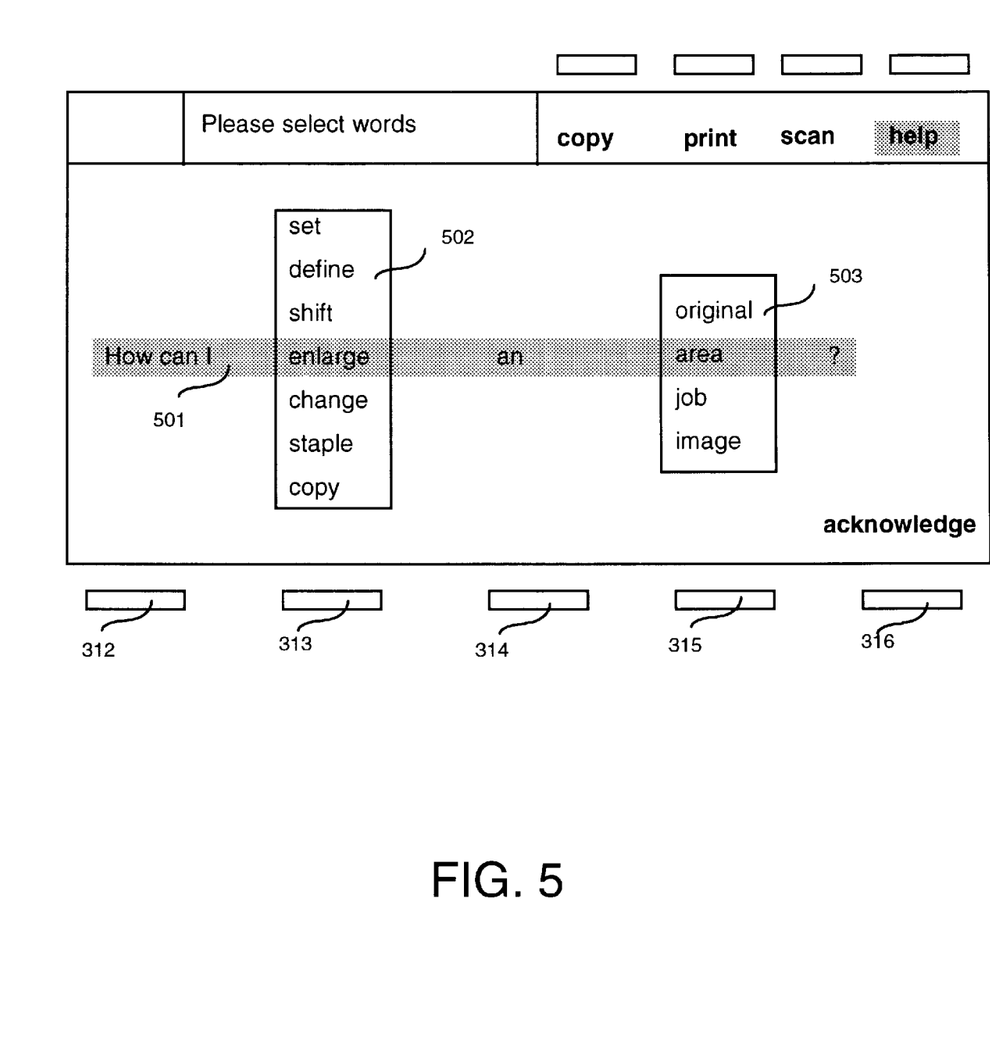
FIG. 5 shows an operating screen according to the invention.
Figure 6:
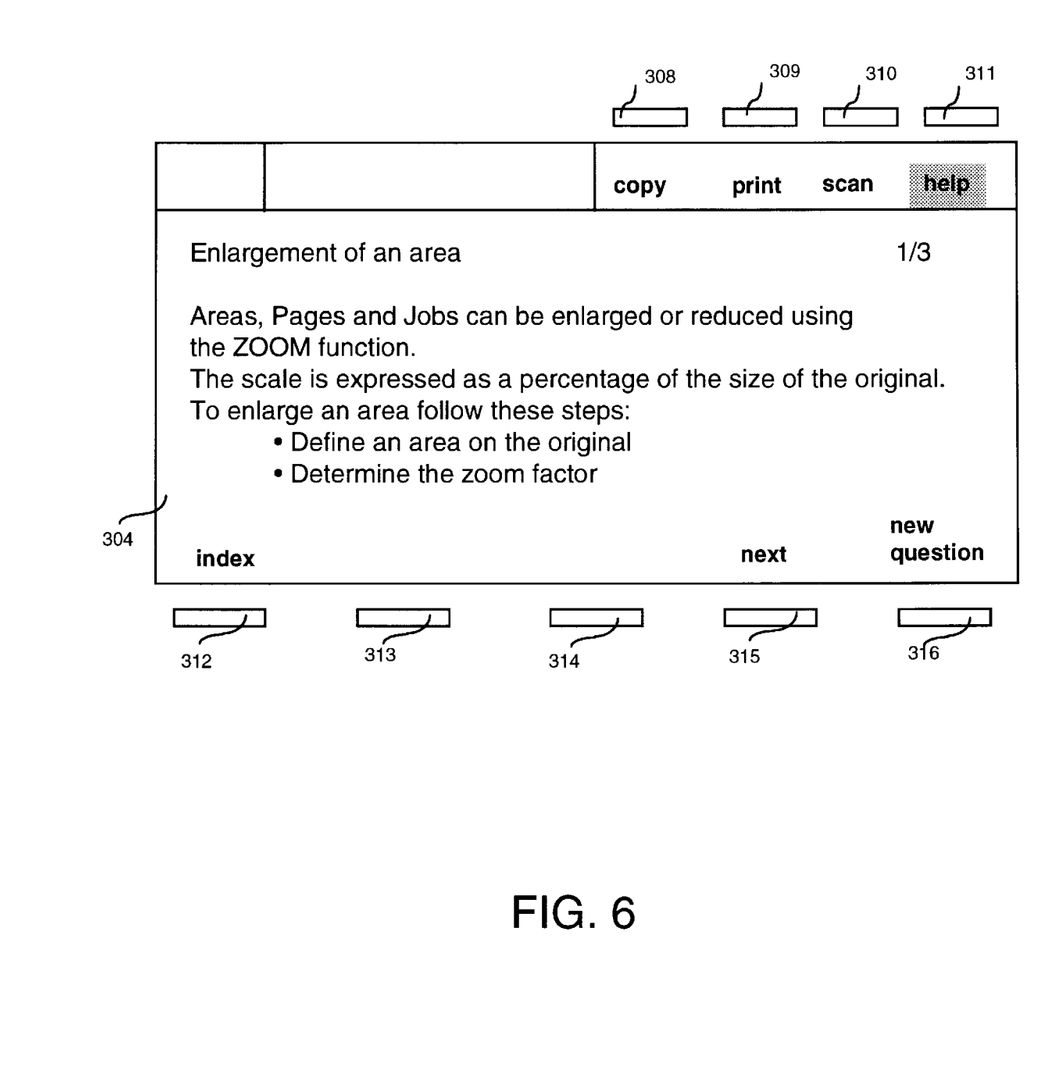
FIG. 6 shows a help screen obtained according to the invention.
Figure 7:
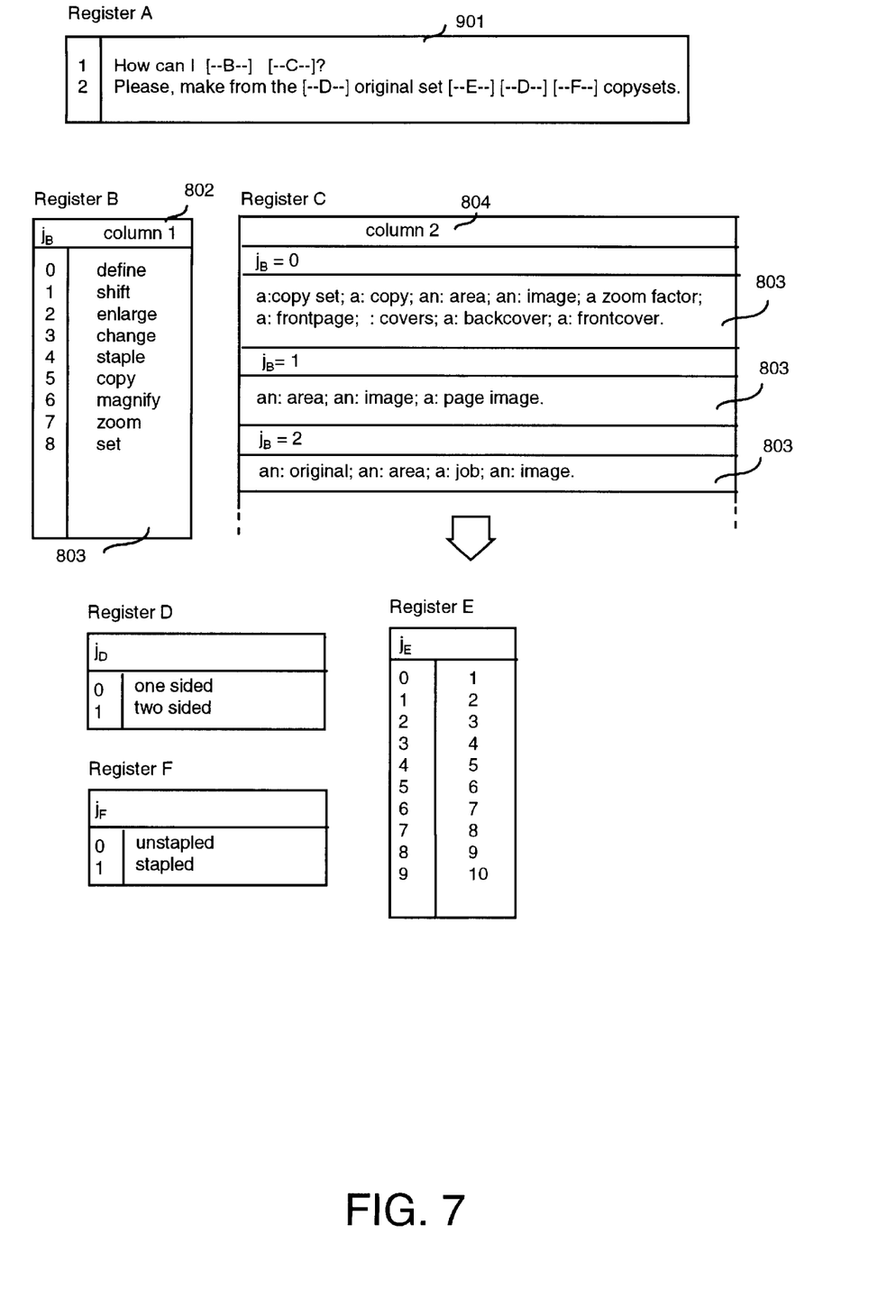
FIG. 7 shows a memory organisation for a first embodiment of the invention.
Figure 8:
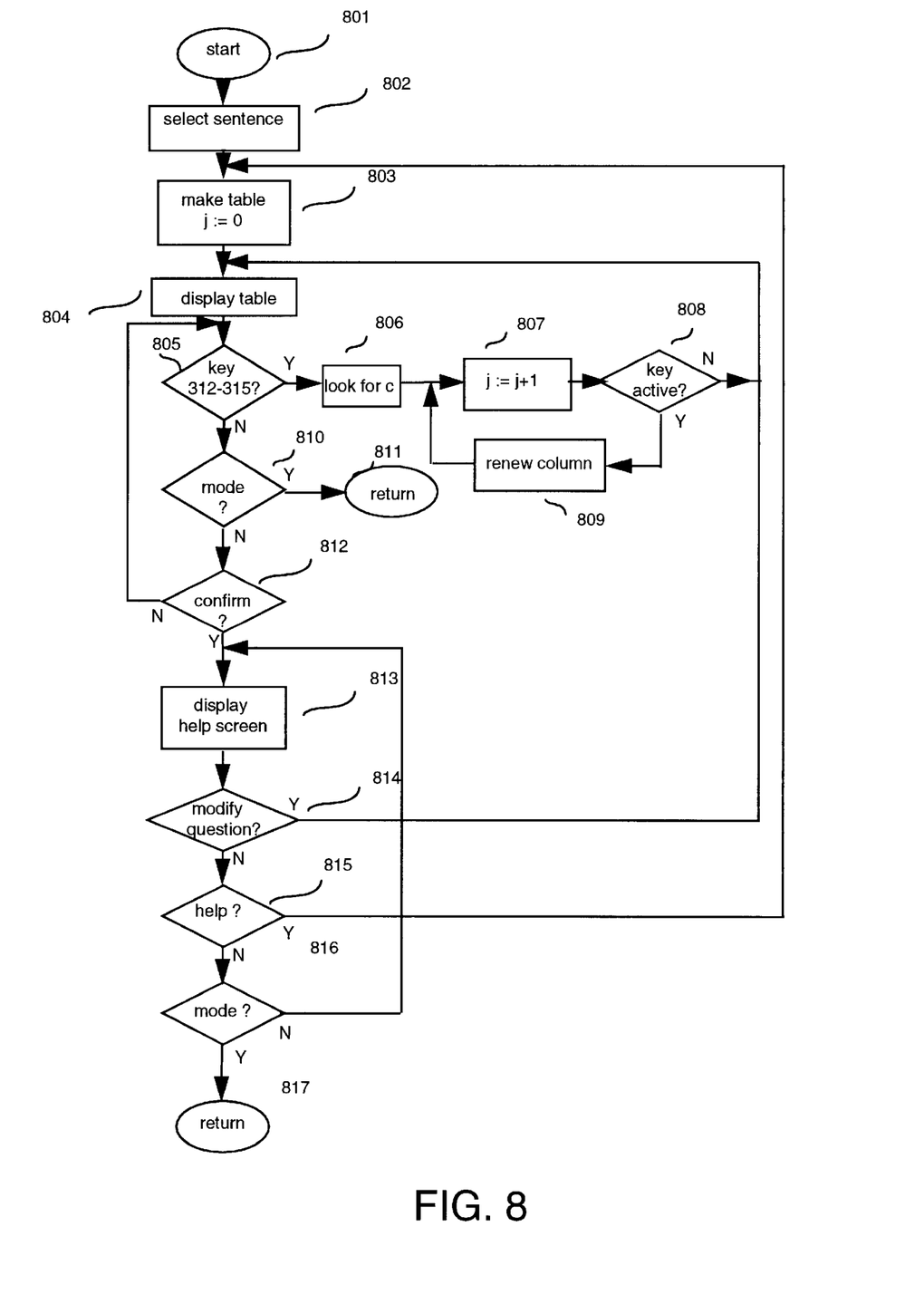
FIG. 8 is a flow diagram in accordance with a method of performing the invention.

FIG. 3 shows a further development of the operator control panel 207 of the reproduction apparatus. It should be noted that the operating screens according to the invention as shown in FIGS. 4 to 6 are used for the help function. However, the invention is not restricted thereto and the memory organisation and method illustrated in FIGS. 7 and 8 are accordingly also suitable for inputting job settings to the apparatus.

The operator control panel 207 comprises a display screen 110 and a number of keys. The display screen 110 is of the LCD type and the screen content can be defined to pixel level. The display screen is divided up into a number of screen areas denoted by references 301, 302, 303 and 304. Screen area 301 shows the number of copies or copy sets to be made. Screen area 302 shows apparatus messages, such as error messages or status messages. Screen area 303 indicates a selected mode, and finally screen area 304 shows main menus and any sub-menus. A start key 305, number keys 306 and a correction key 307 are disposed at the bottom of the panel.

The start key 305 is used to start up a job to be performed by the reproduction apparatus, e.g. copying an original sheet or sheets fed in the original feeder. Start key 305 is also used to confirm settings made. The number of prints that can be made can be set by the number keys 306. The number set for a reproduction job is displayed in screen section 301. The correction key 307 is used to interrupt the copying process and cancel any settings made.

Directly around the display screen 110 are a number of keys which can be coupled functionally with a specific area on the display screen. Keys 308, 309 and 310 are used to call up main menus for, respectively, copying, scanning and printing. Key 311 is used to activate a help function. The key functions are displayed in the screen area 303, the selected function being shown with a different background from the other functions. The main menu and any sub-menus are displayed in screen area 304. The latter is divided into five columns, each column being provided with a cascade key, references 312 to 316 respectively. Each column contains alternative options for a function and the respective cascade keys which select a following option on each activation can be used to make a selection. Finally, a number value for an option can be selected if necessary by actuation of the up-down keys 317.

FIG. 4 shows the display screen in the situation in which the main menu selected is for copying. This main menu has three sub-menus: "original>copy", "delivery" and "edit". These are indicated in the left-hand cascade column 401. The operator selects a sub-menu with the cascade key 312. The sub-menu is displayed in the remaining four columns of the screen area 304. In the situation illustrated, the sub-menu selected is "original>copy". This sub-menu has four functions allocated to the other four cascade columns. With the cascade column "simplex/duplex", denoted by reference 402 in the drawing, this column corresponding to cascade key 312, the operator selects whether simplex or duplex printing is required for a given simplex or duplex original. With the cascade column "original type" denoted by reference 403, the operator inputs the type of the original for introduction. With the cascade column "density", 404, the operator inputs the required black level of the prints. For this purpose the operator selects with cascade key 315 the option "auto" or the option "value". If the option "value" has been selected, then a value can be set by actuation of the up/down keys 317. With the cascade column "zoom", 405, the operator can set any required enlargement. When all the settings are as required, confirmation is obtained by activating the start button. The job is then carried out in accordance with the settings.

The invention will now be explained in detail with reference to FIGS. 5 and 6. If the operator has selected the help function by activating key 311, then screen area 304 displays a help screen in accordance with the invention. This help screen shows a question 501, which can easily be amended by the operator. The question starts with the phrase "How can I". A column 502 of verbs is then shown, from which the user can select one. This column behaves as a cascade column, each word of which represents an option for selection. The word selected is in line with the preceding phrase shown on the screen. Selection is effected by activating the cascade key so that each word shifts down one position from the column and hence a following word comes to the selection position, i.e. the position in line with the preceding phrase. If cascade key 313 is kept depressed, the scrolling is repeated so that a different word can be selected more rapidly.

Often it will not be possible to display all the words simultaneously. In that case, the column displays new words from the top and words at the bottom of the column visible on the screen disappear. The words of the set are displayed in a specific sequence, the last word being followed again by the first word. In this way the whole set can be scrolled cyclic and one direction of scrolling is enough.

In FIG. 5, the word "enlarge" has been selected in column 502. The sentence then continues with the word "an", shown in the third cascade column, and continues with a second column 503, now containing nouns, of which the user must again select one. In the drawing the word "area" has been selected. Once the question formed in this way has been composed to the user's requirements, then the operator confirms the sentence by activating key 316. The question is then processed by the system.

FIG. 6 shows the help screen shown in screen area 304 to answer the question. The keys 312–316 are allocated the functions indicated on the screen: key 315 can be used to skip to the next page, key 314 skips back to a previous page and key 316 returns to the screen on which a question can be formulated.

The "copy", "scan" and "print" keys, denoted by the references 308, 309 and 310 respectively, can be used at any time to return to one of the screens in order to input adjustments.

The method according to the invention will now be described with reference to the memory organisation shown in FIG. 7 and the flow diagram shown in FIG. 8. As shown in FIG. 7, there is a first register A in which a number of template sentences are stored. There is a number of other registers B–E in which word sets are stored. In a template sentence, the word fields are denoted by square brackets. A reference to a register with a corresponding word set is contained in the square brackets. Each word set comprises a number of words or word units indexed with an index j specific to each word set. The registers B, D, E and F each contain one word set. Register C contains a number of word sets. Each word set from register C is coupled to a specific word unit from register B.

The drawing shows that the first template sentence in register A contains two word fields corresponding to word sets stored in the respective registers B and C. Register B contains a number of verbs, each verb being associated with a specific other word set from register C. This prevents a user, for example, from formulating a question such as "How can I staple a zoom factor". A word set from register C is identified by the index j of B. Within a word set of C, each word unit is then further identified by the index $j_c$ (not shown in the drawing). In register B, a word unit corresponds to one word, while, in register D, a word unit comprises two words in each case. In register C, a word unit is preceded by an intermediate phrase. An intermediate phrase of this kind is not included in the column, but only in the sentence itself when the associated word unit has been selected.

The order of the word units in a word set may be alphabetical but can also be grouped arbitrarily or logically.

The method according to the invention will now be described with reference to the flow diagram shown in FIG. 8. The procedure shown in FIG. 8 is called up by activating key 311. Beginning with the start situation 801, a template sentence from register A is selected in step 802. The sentence selected is determined by the machine mode. In the present case, since key 311 has been activated, sentence number 1 has been selected. In step 803, a table as illustrated here is made with, for each word field, indicated with the index c, the cascade key coupled thereto and the register coupled thereto.

| Word field | Key | Register |
|---|---|---|
| c = 2 | 313 | B |
| c = 2 | 315 | C |

In step 804, the template sentence and, column-wise for each word field c, the coupled word set from the associated register are displayed. The instantaneous value of the index j for each word set during the progress of the procedure determines which word unit is placed in the selection position. The other words from the word set are placed above it and beneath it. If the value of the index j changes, then the words shift vertically. The index j initially has the value 0, so that at the start of the procedure the words having index j=0 are placed in the selection position and as a result initially a required default help position is displayed. It should also be noted that in the present example, in which register C has a number of word sets, determining which word set from register C is coupled with word field 2 and hence displayed column-wise on the screen must be effected on the basis of the instantaneous index of the word set from register B.

In step 805 a check is made whether one of the cascade keys to which a word field is coupled according to the table has been activated. If so, then in step 806 the table is searched to find what value of c, hence which word field, is coupled to the activated key. In step 807 the index j for the corresponding word set is then increased by one. Step 808 then checks whether the present key is still activated during a specific time window. If so (Y), then step 809 is carried out, in which only the display of the present column is adapted on the screen to the new value of j and step 807 is again carried out. In this way, with a repeated action of the associated cascade key, other columns dependent on the present column are prevented from also changing.

If step 808 finds that the present key is no longer activated (N), then step 804 is again carried out. In step 804 the display on the screen of all the columns is adapted to new values of c and j. If step 805 finds that none of the cascade keys to which a word field is coupled has been activated (N), then step 810 checks whether one of the mode keys 308–310 has been activated. If so (Y), the help procedure is terminated (811). If not (N), step 812 checks whether the confirmation key 316 has been activated. If not (N), the routine returns to step 805. In this state, in which the various keys are respectively activated, the operator has the opportunity of amending the help question until he is satisfied with the question formed in this way. At that instant he activates the confirmation key 316. This is checked in step 812 (Y) and the method proceeds to step 813. In the latter, a help screen associated with the help question is identified and displayed in the screen area 304 on the basis of the indices of the different word fields. In the state associated with this step, the operator has the opportunity of calling up any continuation screens, but this is not discussed in detail here.

After step 813, a check is made in step 814 as to whether key 316 has been activated ("modify question"). If so (Y), step 804 is carried out and the question is displayed just as the operator had previously formed it but the values of the indices j are not changed. Starting from this sentence, the operator can formulate a new help question. If this is not the case, then a check is made in step 815 as to whether the help key 311 has been activated. If so (Y), step 803 is carried out. The initial state is formed and the initial question is displayed. The operator can again formulate a new question. If the help key is not activated, then a check is made in step 816 as to whether one of the mode keys 308, 309 and 310 has been activated. If not (N), step 813 is carried out again. If one of the mode keys has been activated, end state 817 is reached and the system returns to an operating screen associated with the selected mode.

The invention is not limited to the embodiment described in detail here. If the sentence is too long to be displayed on the screen in one line, then the sentence can be scrolled horizontally. It is also possible to display the sentence on two or more lines of the display screen, the columns with the alternatives being displayed on only one line. Another possible embodiment is one in which the cascade keys have an upward and downward function so that the columns can be moved both up and down.

If the operator control unit is provided with its own processor unit processing all the interactions both with the user and with the central control unit, the procedure as shown in FIG. 8 can also be carried out locally on this processor unit. If the control unit does not have a local processor unit, then the procedure will be carried out on the central control unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An operator control unit for operator control of a reproduction system, the control unit comprising:
    display means for displaying operating screens;
    operator control means for making selections on said operating screens;
    a first memory for storing a template sentence containing a series of words and word fields;
    a second memory for storing word sets corresponding to the word fields, each said word set containing word units;
    generator means for generating a first operating screen for displaying the template sentence and for displaying corresponding word sets near said word fields;
    word unit means for selecting a word unit from one of said word sets in response to user actuation of said operator interface in order to include the word unit in a corresponding word field;
    instruction selection means for selecting a processor instruction based upon said template sentence and the selected word units;
    confirmation means for confirming the selected word units in response to further user actuation of said operator interface; and processor means for performing the processor instruction selected by the instruction selection means when the confirmation means is activated by the user.

2. The operator control unit according to the preceding claim 1, wherein:

there are at least two corresponding word sets for each of said word fields, the operator control unit further comprising word set selection means for selecting one of the at least two corresponding word sets for display on the screen near the corresponding word field, on the basis of a word unit selected in another word field.

3. The operator control unit according to claim 2, wherein said operator control means has a repetitive mode of operation such that word set selection is blocked for a period of the repetitive operation for the purpose of selecting a word unit in the other word field.

4. The operator control unit according to claim 1, wherein the first memory stores at least two template sentences and the operator control unit further comprises:

means for selecting a template sentence in dependence on the selections made so far by the operator on the operating screen.

5. The operator control unit according to claim 1, further comprising:

means for modifying a template sentence in dependence on selected word units.

6. The operator control unit according to claim 1, wherein said generator means depicts the template sentence along a first axis and said word sets along second axis extending perpendicularly to the first axis and intersecting the template sentence at the corresponding word fields, respectively.

7. The operator control unit according to claim 1, wherein the selected instruction instructs the processor means to display a help screen.

8. The operator control unit according to claim 1, wherein the control means is constructed as cascade keys.

9. A reproduction apparatus comprising:

at least one of a scanning unit for scanning images and a network interface for receiving print jobs;

a third memory for storing at least one of scanned images and print jobs, respectively;

a printing unit for printing at least one of scanned images and print jobs;

a central control unit for controlling said memory, said printing device and said at least one of said scanning device and said network interface to cooperate and so print printing at least one of scanned images and print jobs; and an operator control unit including:

display means for displaying operating screens;

control means for making selections on said operating screens;

a first memory for storing a template sentence containing a series of words and word fields;

a second memory for storing word sets corresponding to the word fields, each said word set containing word units;

generation means for generating a first operating screen for displaying the template sentence and for displaying corresponding word sets near said word fields;

unit word means for selecting a word unit from one of said word sets in response to user actuation of said operator interface in order to include the word unit in a corresponding word field;

instruction selection means for selecting a processor instruction based upon said template sentence and the selected word units;

confirmation means for confirming the selected word units in response to further user actuation of said operator interface; and processor means for performing the processor instruction selected by the instruction selection means when the confirmation means is activated by the user.

10. In an operator control unit for operator control of a reproduction system, a method of interfacing with a user, the method comprising:

storing, in a first memory, a template sentence containing a series of words and word fields;

storing, in a second memory, word sets corresponding to the word fields, each said word set containing word units;

generating a first operating screen depicting said template sentence and corresponding word sets near said word fields;

selecting a word unit from one of said word sets in response to user actuation of an operator interface in order to include the word unit in a corresponding word field;

selecting a processor instruction based upon said template sentence and the selected word units;

confirming the selected word units in response to further user actuation of said operator interface; and executing the selected instruction in response to said step of confirming said selected instruction.

11. The method according to claim 10, wherein the template sentence is depicted along a first axis and said word sets are depicted along a second axis extending perpendicularly to the first axis and intersecting the template sentence at the corresponding word fields, respectively.

* * * * *